United States Patent

Tien et al.

[11] Patent Number: 6,138,183
[45] Date of Patent: Oct. 24, 2000

[54] TRANSPARENT DIRECT MEMORY ACCESS

[75] Inventors: Paul Tien, Fremont; Cheng-Yeuan Tsay, Pleasanton; Rsong-Hsiang Shiao, Fremont, all of Calif.

[73] Assignee: ESS Technolgoy Inc., Fremont, Calif.

[21] Appl. No.: 09/074,656

[22] Filed: May 6, 1998

[51] Int. Cl.[7] ............................................. G06F 13/14
[52] U.S. Cl. .............................. 710/22; 710/129; 703/23
[58] Field of Search ........................... 710/22, 28, 126, 710/129, 240, 260, 261, 264, 128; 395/500.44, 500.45, 500.46, 500.47; 703/26, 25, 24, 23

[56] References Cited

U.S. PATENT DOCUMENTS

| | | | |
|---|---|---|---|
| 5,506,997 | 4/1996 | Maguire et al. | 710/260 |
| 5,619,703 | 4/1997 | Omid et al. | 710/261 |
| 5,621,902 | 4/1997 | Cases et al. | 710/129 |
| 5,664,197 | 9/1997 | Kardach et al. | 710/240 |
| 5,673,400 | 9/1997 | Kenny | 710/129 |
| 5,678,064 | 10/1997 | Kulik et al. | 710/28 |
| 5,729,762 | 3/1998 | Kardach et al. | 710/22 |
| 5,740,452 | 4/1998 | Story et al. | 710/261 |
| 5,745,772 | 4/1998 | Klein | 710/266 |
| 5,752,043 | 5/1998 | Suzuki | 710/264 |
| 5,765,024 | 6/1998 | Riley | 710/22 |
| 5,778,242 | 7/1998 | Wang | 712/40 |
| 5,805,842 | 9/1998 | Nagaraj et al. | 710/126 |
| 5,848,278 | 12/1998 | Sakai | 710/260 |

OTHER PUBLICATIONS

Implementing Legacy Audio On The PCI Bus, by Gary Solomon, Intel Corporation 1997.

*Primary Examiner*—Glenn A. Auve
*Attorney, Agent, or Firm*—Gray Cary et al.

[57] ABSTRACT

A transparent direct memory access method comprises emulating an ISA-bus mapped direct memory access controller (ISA-DMAC) with a PCI-bus mapped direct memory access controller (PCI-DMAC). The ISA-DMAC exists, but there may not actually be any resources mapped into the ISA-bus space. Write snooping by the PCI-DMAC of a PCI-bus processor detects whenever an attempt is made to write the ISA-DMAC, and copies the data written into the ISA-DMAC registers into a corresponding register of the PCI-DMAC. The direct memory access operation commanded by the PCI-bus processor of the ISA-DMAC is performed by the PCI-DMAC in the PCI-bus resource space. When the direct memory access operation is completed, the PCI-DMAC updates its registers and does a write back to update the ISA-DMAC registers. The PCI-bus processor can then read the PCI-DMAC directly for status, or if legacy software is running the ISA-DMAC will respond with the appropriate register value.

6 Claims, 3 Drawing Sheets

TRANSPARENT DIRECT MEMORY ACCESS

FIELD OF THE INVENTION

The present invention relates to digital electronic circuits, and more particularly to personal computer PCI-bus direct memory access controllers that emulate ISA-bus direct memory access controllers and that redirect ISA-bus resource access requests to PCI-bus resources. The present invention further relates to high performance PCI-bus based PC audio solutions with a common architecture for desktop, notebook, and add-in card computers. The present invention specifically relates to PCI-bus solutions that maintain DOS and SOUNDBLASTER® compatibility without requiring an ISA-bus, a particular core logic chipset, or a system motherboard implementation.

DESCRIPTION OF THE PRIOR ART

IBM-compatible personal computers almost universally used the industry standard architecture (ISA) bus in combination with a motherboard. A great deal of software has been written and sold in the industry that is at least, in part, dependent on the ISA-bus software interfaces and systems resources. The peripheral component interconnect (PCI) bus is now rapidly becoming the universal standard amongst personal computer manufacturers and users. However, the software interfaces and systems resources on a PCI-bus system are different enough to make the installed base of ISA-bus dependent software at least partially incompatible and not upward compatible.

A group of system-bus chip manufacturers have joined forces to endorse a technology they say will help vendors mix PCI and ISA bus subsystems or integrated circuits. However, analysts describe the so-called Common Architecture proposal as a new solution to a problem already adequately solved. The alliance members, Digital Equipment Corp., National Semiconductor Corp., Opti, Pico-Power Technology, Standard Microsystems Corp., Texas Instruments, and VLSI Technology, say the proposed standard will improve the handling and implementation of ISA and PCI devices in a single computer. The new proposal partitions the motherboard, allowing system integrators greater flexibility in their choices of components such as core logic, PCI bridges, and graphics controllers. Because integrators will have more component options, its advocates say, Common Architecture should reduce overall manufacturing costs. Devices based on Common Architecture will emphasize the newer PCI bus, with the older ISA bus supported as an optional feature. While ISA legacy devices will be fully supported, physical-component connections will be routed through the PCI bus to eliminate sideband signals that straddle the chip set. The PCI bus will support distributed direct memory access (DMA) on the ISA side. Manufacturers will have the option of using sideband signals and extra chips on either side. Analysts are nonplused, pointing out that system vendors seem satisfied with current PCI/ISA architectures, bus standards, and core-logic chip sets.

The PCI-based audio and communications accelerator industry is also rapidly transitioning from ISA bus-based audio solutions to the more powerful PCI-bus enabled engines. The ISA-bus is increasingly unable to support the advanced audio processing required by new multimedia applications and upcoming personal computer standards. This is driving the need for high bandwidth PCI-bus accelerators. A second factor is the close coupling of audio and modem technology that makes integrating these subsystems more attractive.

PC-audio is predicted to move from ISA-bus based products implementing the SOUNDBLASTER® standard to PCI-bus based products that will deliver enhanced levels of performance. Products that provide backward compatibility for legacy applications, as well as enhanced DIRECT-SOUND® performance, are expected to have a commercial advantage during this period of transition.

Legacy game compatibility will need to be maintained as more audio equipment and their manufacturers move to use the PCI-bus.

Microsoft DOS-based games are conventionally supported by at least two industry legacy-support protocols, e.g., PC/PCI-bus, and distributed DMA (DDMA). However these do not offer complete hardware game compatibility that is independent of the PC/PCI-bus or DDMA support. Market realities are such that software compatibility must be maintained for all applications written for SOUND-BLASTER PRO®, Ad Lib, Microsoft WINDOWS Sound System, DIRECTSOUND™, and Microsoft ACTIVEX®.

The bandwidth and bus mastering capabilities required for optimum support of software that has been written to Microsoft DIRECTSOUND®, DIRECT3DSOUND®, and DIRECTX® application programming interfaces require a PCI-bus system. The market also demands that PC audio solutions continue to support the vast installed base of applications developed for the SOUNDBLASTER/ISA-bus standard. Complete hardware support is needed for existing software titles written for the SOUNDBLASTER standard without diminishing the new audio capabilities enabled by the PCI-bus.

Therefore, an advanced and scalable PCI-bus based audio product family is needed that preserves complete DOS game support, regardless of core logic legacy support, to eliminate the competitive risk of not being compatible with the huge installed base of DOS games.

As a baseline feature, the PC audio system has been overlooked for years. While the graphics market has been the recipient of broad and rapid innovation, the PC audio system has been neglected. All of this is about to change. As the audio system makes the jump from ISA to PCI, it is afforded access to a tremendous increase in bandwidth that translates into a host of new features and innovation. One new feature, wavetable synthesis, has really been around for several years. However, most traditional wavetable solutions were implemented in an extra synthesis chip and required a wavetable ROM to store sound samples. The latest PCI audio controller chips integrate the wavetable synthesis onto an audio controller chip. With access to PCI's bandwidth, sound samples can be stored in main memory and the wavetable ROM can be eliminated. The net result is less cost for the audio subsystem.

A major stumbling block to PCI-based audio is so-called "legacy" audio compatibility. PC audio was initially developed in a DOS world, along with ISA interrupts and ISA DMA requests. A large base of PC game developers incorporated ISA hardware-specific code in their software. As a result, these games are married to SOUNDBLASTER—compatible legacy audio. Supporting such hardware-specific code has turned out to be a tremendous challenge for new audio chips as they move to the ISA bus. However, support of the installed software base remains a baseline requirement for new audio solutions. Despite such challenges, PCI-based audio is here.

According to Aureal Semiconductor (Fremont, Calif.) DOS legacy compatibility is important, no PC audio solution is complete without support for DOS legacy applications. The Aureal AU8820 provides DOS audio legacy emulation for SOUNDBLASTER Pro with OPL3 FM synthesis, for both real-mode DOS and Windows DOS box operation. A "patent pending" legacy emulation technology used in the AU8820 is claimed to have been in production for two years, and is said to be fully compatible for both motherboard and add-in card solutions. This, without the need for a work-around PC/PCI or D/DMA side band connection to the ISA-bus.

Modems are the only other PC component that are still ISA-based. The Aureal Semiconductor AU8820 includes an interface to existing, standard ISA modem chip sets, such as the latest 56 k modems from U.S. Robotics and Rockwell. This unique feature offers two key advantages to OEMs, the ability to build PCI based audio-telephony combo cards, and the design of a PC without an ISA bus.

SUMMARY OF THE INVENTION

It is therefore an object of the present invention to provide a system for supporting ISA-bus applications software on a PCI-based hardware system.

It is a further object of the present invention to provide a direct memory access controller that accepts ISA-bus interrupt controller commands and accesses and that translates these into PCI-bus equivalent interrupt controller commands and accesses.

It is a still further object of the present invention to emulate an ISA-bus interrupt controller that accepts and responds to direct memory access controller commands and accesses for execution by a PCI-bus interrupt controller mapped into a PCI-bus memory resource.

Briefly, a transparent direct memory access method embodiment of the present invention comprises emulating an ISA-bus mapped direct memory access controller (ISA-DMAC) with a PCI-bus mapped direct memory access controller (PCI-DMAC). The ISA-DMAC exists, but there may not actually be any resources mapped into the ISA-bus space. Write snooping by the PCI-DMAC of a PCI-bus processor detects whenever an attempt is made to write the ISA-DMAC, and copies the data written into the ISA-DWIAC registers into a corresponding register of the PCI-DMAC. The direct memory access operation commanded by the PCI-bus processor of the ISA-DMAC is performed by the PCI-DMAC in the PCI-bus resource space. When the direct memory access operation is completed, the PCI-DMAC updates its registers and does a write back to update the ISA-DMAC registers. The PCI-bus processor can then read the PCI-DMAC directly for status, or if legacy software is running the ISA-DMAC will respond with the appropriate register value.

An advantage of the present invention is that a method is provided for running ISA game software on a PCI-based system.

Another advantage of the present invention is a system is provided that does not require sideband connections in order to run legacy audio programs.

These and other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENT

Figure 1:
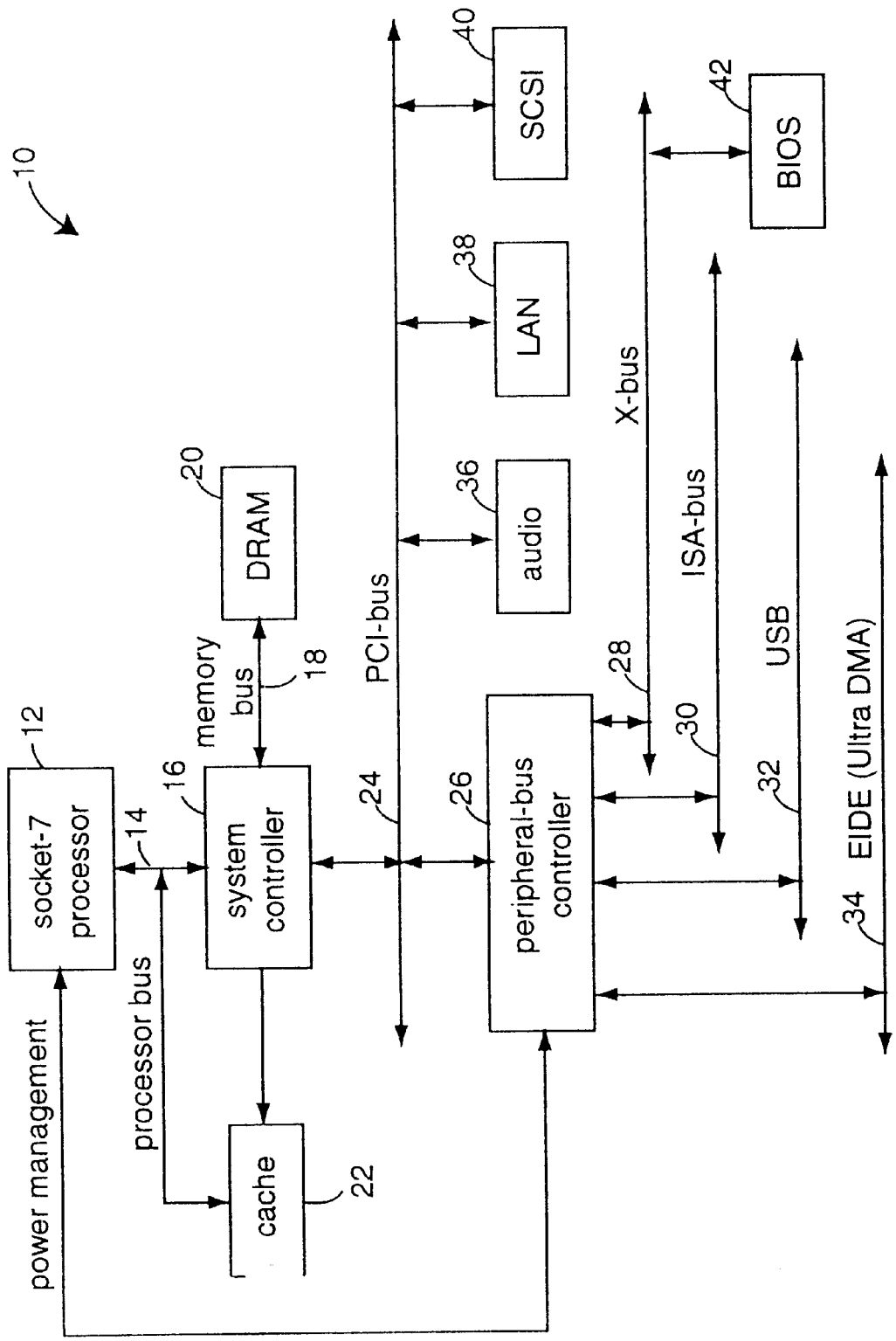
FIG. 1 is a functional block diagram of a PC system embodiment of the present invention.

FIG. 1 illustrates a personal computer (PC) embodiment of the present invention, referred to herein by the general reference numeral 10. The PC 10 comprises a "socket-7" type microprocessor 12, a processor bus 14, a system controller 16, a memory bus 18, a dynamic random access memory (DRAM) 20, and a cache 22. All these drive a peripheral component interconnect (PCI) bus 24. A peripheral-bus controller 26 provides a bridge to several buses including an X-bus 28, an industry standard architecture (ISA) bus 30, a universal serial bus (USB) 32, and an enhanced-IDE (EIDE) bus 34. A PCI-bus audio accelerator peripheral 36, a local area network (LAN) controller 38, and a small computer system interface (SCSI) controller 40 all connect to the PCI-bus 24. A basic input-output system (BIOS) bootup memory module 42 is resident on the ISA-bus 30.

In one embodiment, the system controller 16 comprises an Advanced Micro-Devices (Sunnyvale, Calif.) AMD-640 system controller ("Northbridge"), has a 64-bit Socket-7 interface, integrated writeback cache controller, system memory controller, and PCI bus controller. Such Socket-7 interface is optimized for the AMD-K6 processor, providing 3-1-1-1-1-1-1-1 transfer timing for both read and write transactions from PBSRAM at sixty-six MHz. (The number sequence refers to the CPU clock "t" cycles for each operation, i.e., 3-1-1-1 means the first data will be available at the third "t" when issue the operation, then the consequence data only need additional one "t" cycle, and so on.)

The AMD-640's internal memory controller has a data buffering design that uses four cache lines, e.g., sixteen quadwords, of processor-to-DRAM or cache-to-DRAM write buffering with concurrent writeback capability to accelerate writeback and write-miss cycles. The integrated PCI bus controller does concurrent processor and PCI operation with a five-doubleword posted write buffer. PCI concurrency with DRAM or cache memory is achieved through a 48-doubleword post write buffer and 26-doubleword prefetch buffer. Byte-merging is used to optimize processor-to-PCI throughput and reduce PCI bus traffic by converting consecutive processor addresses into burst PCI cycles. The AMD-640 system controller uses a variety of techniques to minimize PCI initiator read latency and DRAM access, including snoop ahead, snoop filtering, forwarding cache writebacks to the PCI initiator, and merging L1 writebacks into the PCI-posted write buffers to minimize PCI initiator read latency and DRAM utilization. To minimize snoop overhead, the integrated PCI controller supports enhanced PCI bus commands, such as memory-read-line, memory-read-multiple, and memory-write-invalidate. The combination allows a PCI initiator to achieve the full 133-Mbps burst transfer rate.

In another embodiment, the peripheral-bus controller 26 comprises an AMD-645 peripheral bus controller ("Southbridge"). The AMD-645 has an integrated ISA bus controller, enhanced master mode PCI EIDE controller with Ultra DMA/33 technology, an ACPI-compatible power management unit, a USB controller, a PS2-compatible keyboard/ mouse controller, and a real-time clock (RTC) with extended 256-byte CMOS RAM. The on-chip EIDE controller has a dual-channel DMA engine capable of interlaced dual-channel commands. High-bandwidth PCI transfers are achieved by a sixteen double-word data FIFO with full scatter and gather capability. The integrated USB controller has a root hub with two ports having 18-level-deep data FIFOs and built-in physical layer transceivers.

The USB controller also offers backward compatibility with legacy keyboard and PS/2 mouse support.

The AMD-645 peripheral bus controller is marketed as meeting Microsoft Windows® 95 Plug-and-Play requirements with steerable PCI interrupts, ISA interrupts, and DMA channels. The integrated power management unit is compliant with ACPI and APM and provides dedicated input pins for external modem ring indication and power-on, five general-purpose I/O pins with option for I2C port, and sixteen general-purpose pins that can be programmed as inputs or outputs. To manage power management events, the AMD-645 controller includes an ACPI power management timer, a GP0 timer, a GP1 timer, a secondary event timer, and a conserve mode timer. Two types of sleep states, e.g., soft-off and power-on suspend, are supported with hardware automatic wake-up. Additional functionality includes event monitoring, CPU clock throttling, hardware and software-based event handling, and multiple external SMI sources.

The PCI-bus audio accelerator peripheral 36 preferably comprises an ESS Technology (Fremont, Calif.) PCI audio accelerator chip, e.g., marketed as MAESTRO-1™. At a minimum, the PCI-bus audio accelerator peripheral 36 is preferably compliant with major industry standards including the Audio Subsystem Specification of PC97, Windows 95 DirectSound™, Windows Sound System, AC'97 CODEC Interface, and the PCI 2.1 Bus Specification.

The Maestro-1 is a dual audio-engine architecture that comprises of a 64-voice, pipelined, wavetable synthesizer and a programmable audio signal processor that can simultaneously handle multiple audio streams of different data types, high-quality music synthesis, and voice compression and decompression.

The PCI-bus audio accelerator peripheral 36 preferably comprises a high-performance PCI interface, that retains full compatibility to existing DOS games through hardware emulation. In general, the PCI bus is required for PC audio hardware to smoothly reproduce high-fidelity audio from Internet, MIDI, wave, and conferencing sources. The PCI bus 24 enables the transfer of multiple, independent data streams. The PCI-standard improves data transfer efficiency by at least twenty times over the ISA-standard. This is crucial for low-latency audio applications, such as Internet interactive audio.

Microsoft's DirectSound applications programming interface (application programming interface) is accelerated by digitally mixing up to thirty-two PCM streams of any frequency down to a single output stream of forty-eight kHz. Hardware acceleration frees the CPU to perform other tasks, such as video processing.

The PCI-bus audio accelerator peripheral 36 preferably comprises a wave processor (WP) that provides high-quality wavetable synthesis cost-effectively by storing down loadable table samples in system memory, e.g., DRAM 20. Samples are retrieved using the PCI bus 24 during playback. Each channel/stream preferably has an independent pan, tremolo, vibrato and tone filter. A synthesizer is also preferably included for advanced audio effects such as reverb, chorus, flange, echo and 3-D spatial enhancement.

The PCI-bus audio accelerator peripheral 36 preferably provides complete DOS game compatibility via PC/PCI DMA, distributed DMA, and transparent DMA. The transparent DMA requires no sideband signals and is critically compatible with all Intel PENTIUM and PENTIUM-PRO chipsets with no constraints.

Plug-and-play is an industry standard whose specifications were developed by Intel Architecture Lab and Microsoft to ensure long-term compatibility across cards, systems and software. Plug-and-play acts as a configuration agent to take over and handle the configuration process internally. It automatically assigns resources such as IRQs, I/O addresses and DMA channels. This makes installing add-on cards simple, eliminating the trial-and-error guesswork. All the user must do is plug in the plug-and-play-enabled card.

Under the DOS environment, to perform the plug-and-play feature, the plug-and-play BIOS, ICU and plug-and-play devices are required. In the Windows 95, the plug-and-play function is controlled by the operation system, and the Windows 95 only takes the ESCD's information, that generated by plug-and-play BIOS, as reference.

To have the plug-and-play function work, the software and hardware must work together. The operating system, drivers and BIOS must support plug-and-play. The BIOS searches for ISA plug-and-play cards in system slots. If any are found, the BIOS will read the configuration preference table stored in the cards, and will assign proper, non-conflict resources. If users install legacy cards on the motherboard, then the IRQs and DMAs must be set manually in the BIOS setup.

The PCI-bus audio accelerator peripheral 36 provides DOS compatibility to protect the end-users' software investment. Existing software and games for the PC have been designed to run on ISA-based sound cards that write directly to the inherently slow ISA hardware using Intel-type 8237-DMAC interrupt controller (IRQ) and direct memory access (DMA) signals.

Such IRQ and DMA signals are not present on the PCI-bus 24, but allows legacy software to function at the full speed of the PCI-bus 24 as if ISA signals were really being generated. Placing the PCI-bus audio accelerator peripheral 36 on the PCI-bus 24 allows four to twenty times the speed over much slower DMA transfers on the ISA bus, and therefore reduces system overhead without PCI to ISA bridging.

The PCI-bus audio accelerator peripheral 36 supports 32-bit PCI-bus interfacing with 64-bit to 32-bit data conversion. Five doubleword levels of post write buffers are included to allow for concurrent CPU and PCI operation. Consecutive CPU addresses are converted into burst PCI cycles with byte merging capability for optimal CPU to PCI throughput. For PCI master operation, sixty-four doubleword levels of post write buffers and thirty-two doubleword levels of prefetch buffers are included for concurrent PCI bus and DRAM/cache accesses. Enhanced PCI-bus 24 commands are supported, such as memory-read-line, memory-read-multiple and memory-write-invalid commands to minimize snoop overhead. Snoop ahead, snoop filtering, L1 write-back forward to PCI master and L1 write-back merged with PCI post write buffers are also preferably included to minimize PCI master read latency and DRAM utilization.

The PCI-bus 24 is isolated from the processor bus 14 by a system controller 16. The processor 12 writes data to PCI peripherals and the system controller 16 stores the data in its buffer, allowing the processor 12 go on to its next operation rather than waiting for the transfer to complete. The buffer then feeds the data to the peripheral at the most efficient rate.

PCI also supports bus mastering by intelligent devices that can take control of the bus and perform tasks independently of the processor 12. The processor 12 can run concurrently with the bus master peripheral and, because of its buffered design, can operate independently when a PCI peripheral is active.

A single PCI-bus 24 can only support four expansion slots without violating the specification's loading constraints, with one PCI device per expansion slot. High end system designers have recently begun to build systems using a PCI-to-PCI bridge to provide more expansion slots on the motherboard. The PCI-bus Specification provides for an automatic configuration of any adapter or peripheral plugged into the bus, eliminating conflicts between boards in the system and the need for jumper headers on a board.

Figure 2:
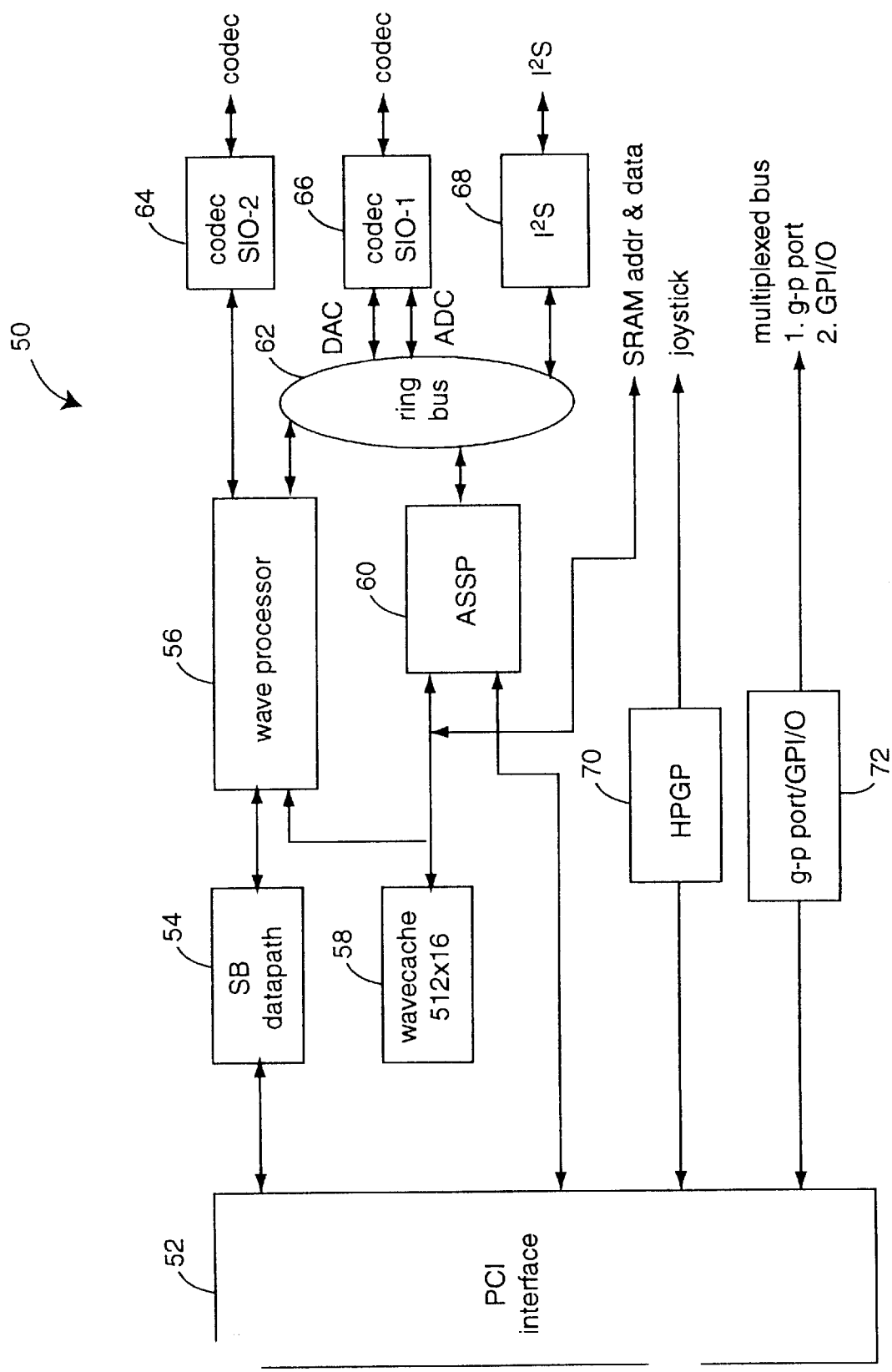
FIG. 2 is a block diagram of an audio accelerator embodiment of the present invention such as included in FIG. 1.

FIG. 2 illustrates a PCI-bus audio accelerator peripheral 50 that is similar to the audio accelerator peripheral 36 of FIG. 1. The PCI-bus audio accelerator peripheral 50 comprises a PCI-interface 52, a SOUNDBLASTER datapath 54, a wave processor 56, a 512×16 wave cache 58, an application specific signal processor (ASSP) 60, a ring bus 62, an SIO-2 codec 64, an SIO-1 codec 66, and an I$^2$S serial interface 68. A high-performance game port (HPGP) 70 provides an interface for a joystick, and a general purpose input-output port (GPI/O) 72 provides connections to multiplexed buses.

The wave processor 56 is a sixty-four-channel, pipelined wave processor. The ASSP 60 is a programmable audio signal processor. Together these provide simultaneous support for multiple audio streams of different types. Such architecture enables complex, three-dimension positional gaming sound effects to be implemented while also supporting voice communications over the Internet from multiple sources. Embodiments of the present invention preferably support sixty-four independently programmable wave processor channels and provide for DIRECTSOUND® hardware acceleration with digital mixing of up to thirty-two wave streams. Audio streams of any frequency are converted to forty-eight kHz. Each of the sixty-four channels can be assigned its own parameters to control panning, tremolo, vibrato, and tone-filtering. The channels also support independently programmable special effects, e.g., reverb, chorus, flange, echo, and three-dimension spatial enhancements to create positional special effects. The high bandwidth PCI-bus 24 is used to store MIDI-samples in main memory, DRAM 20. Downloadable sound samples relieve needing ROM-type memory to store sound fonts, a allow software developers to control the sound PCI-bus audio accelerators.

The original PC platform used the DOS operating system and had no standard software drivers for options such as audio. Creative Labs' SOUNDBLASTER audio technology successfully captured the market by persuading software developers to write directly to their device's register set. Other audio chip vendors began to support the SOUNDBLASTER register interface so that existing software titles written to support the interface would work with their hardware devices.

A de facto standard was born that would support one stereo or two mono audio streams on the low bandwidth ISA bus. Because of the huge library of games and other applications written to support the SOUNDBLASTER standard, it is not anticipated that SOUNDBLASTER ISA bus support will vanish suddenly, but the market is clearly in transition to more sophisticated PCI audio implementations.

Microsoft has also taken an active role in encouraging the move to PCI-based audio to expand the role of the PC in both the consumer and business markets with enhanced sound and communications capabilities. Microsoft's DIRECTSOUND and DIRECT3D application programming interfaces support multiple audio data streams occurring simultaneously in real-time, allowing software developers to use surround sound and 3D audio effects. In addition, Microsoft's DIRECTX application programming interfaces for interactive multimedia and ActiveX controls for sharing information between applications both support multiple audio streams.

However, the ISA bus SOUNDBLASTER standard is limited to one DMA channel providing direct access to a PC's memory for a single data stream, and so is clearly inadequate for supporting the advanced audio effects and capabilities that Microsoft's relatively new software drivers enable. The present invention preferably supports sixty-four bus mastering DMA channels to take advantage of the capabilities now supported at the operating system level by Microsoft.

Microsoft's Win32 Driver Model (WDM) encompasses DIRECTX and ActiveX application programming interfaces while also broadening their reach to support advanced audio streams management features such as synchronization of multiple streams and stream positioning. WDM also presents developers with a common application programming interface and device driver model for both Windows NT and Memphis, the next planned update to Windows 95.

The continued reliance on ISA bus technology has also become a significant performance bottleneck for engineers designing systems. Continued utilization of the SOUNDBLASTER-standard ISA bus means that the host CPU must be constantly interrupted to manage the task of audio data transfer. While the impact of the overhead of ISA-based audio support has been reduced somewhat through implementing techniques such as "F-Mode DMA" that consolidates several transactions before initiating a CPU interrupt, the cost of maintaining support for ISA-based solutions in CPU cycles is high.

It is estimated that twenty percent of a modem CPU's capacity is wasted in producing 16-bit stereo sound at 44.1 kHz with the ISA bus-based audio. In contrast, embodiments of the present invention need less than one percent of a CPU's maximum available resources to deliver the same level of performance. The elimination of the ISA system bottleneck enables CPU resources to be used for other activities, including the support of graphics and audio pre-processing by MMX-enabled applications.

A more obvious advantage that the PCI bus brings to audio applications is sheer bandwidth. At 133 MB/second, the PCI bus represents a much larger "pipe" than the 7 MB/second ISA bus. In addition to being able to move large amounts of data quickly through the bus, PCI accelerators are able to transfer multiple data streams with different destinations during a single bus master cycle. Because PCI audio accelerators can support multiple data streams of different types, it can also reduce the latencies typically associated with Internet-based interactive audio, phone and conferencing applications.

Originally, ISA-based SOUNDBLASTER standard solutions supported 8-bit pulse code modulation (PCM) audio that created sound by reproducing digitized sound sample files. Audio file sizes were large, so the number of sounds that could be reproduced by a given software application was minimal. Later, FM Synthesis capabilities were developed that allowed the creation of sounds by synthesizing sine waves.

Most recently, MIDI wavetable synthesis techniques have been developed that enable the faithful reproduction of the voice of musical instruments across the full sound spectrum. Wavetable technology uses algorithms to frequency shift a stored digitized sound sample of the instrument playing to create the various notes, tones and octaves of a performance.

Market acceptance of early PC wavetable sound solutions was hampered by a lack of compatibility with software developed for the SOUNDBLASTER standard and the high cost of the first implementations. Software compatibility has now been resolved by hardware legacy support.

A method embodiment of the present invention, referred to herein as transparent direct memory access (TDMA), creates a virtual ISA bus that interfaces with the PCI bus 24. The ISA bus 30 is not actually accessed, however a 8237-DMAC associated with the peripheral bus controller 26 is accessed when certain bus cycles cannot be intercepted by the audio accelerator 36.

The audio accelerator 36 is a PCI agent on the primary PCI bus segment, and so always gets first right of refusal in claiming cycles that emerge on the PCI bus 24 before they are bridged to the ISA bus 30. But, PCI devices may not claim addresses that belong to the peripheral bus controller (South Bridge) 26 (FIG. 1). So write snoop is allowable, but read intercept of I/O accesses to the ISA-bus DMAC controller is not possible.

The audio accelerator 36 snoops the write accesses to the legacy SOUNDBLASTER compatible I/O references. Read accesses must be fooled by stuffing the references' registers with appropriate values because the read cycles cannot be intercepted. The Intel-type 8237 DMAC emulation is listed in Table I. In a fully backwards compatible system, a software title that communicates directly with "legacy" I/O peripherals, such as the 8237 DMAC registers, SOUNDBLASTER registers, and FM synthesis registers, needs to be able to find these registers, and their underlying functionality intact without requiring any additional software.

TABLE I

| | |
|---|---|
| write snoop | 8-bit DMA controller |
| uses | single-transfer and demand-mode-transfer mechanism of the DMA controller |
| write | multi-channel mask register |
| write | multi-channel mode register |
| write | channel base address register |
| write | channel base count register |
| read | channel current count register for progress and completion of DMA transfer |
| read | channel current address register for progress and completion of DMA transfer |
| read | multi-channel terminal count status register |

PCI agents on the primary PCI bus 24 get first right of refusal on all PCI bus cycles before they are forwarded to the ISA bus 30, provided that the PCI to ISA bridge on the peripheral bus controller 26 is a fully subtractive decoder. The primary PCI bus segment has a "flow through" quality which allows for cycles destined for the ISA bus 30 to be intercepted along the way, and this limits the implementation of PCI based legacy audio to the primary bus segment of the system.

The transplanting of SOUNDBLASTER compatible audio to the PCI bus means moving SOUNDBLASTER's associated ISA bus resources along with it. These ISA resources are typically managed by ISA plug-and-play algorithms. An issue is deciding what to do with respect to the ISA plug-and-play paradigm as these ISA resources move into a gray area situated somewhere between the ISA bus and the PCI bus.

ISA plug-and-play requires relocatable I/O resources. However, there are legacy functions that will not work correctly if their system resources are not located exactly where the legacy software title expects to find them. Therefore, several of the 8237 DMAC registers and files are stuffed with values to be picked up by the processor 12, for example. Conversely, values from the 8237 DMAC registers and files are read that have been written by the processor 12. These registers and files are listed in Table I.

Figure 3:
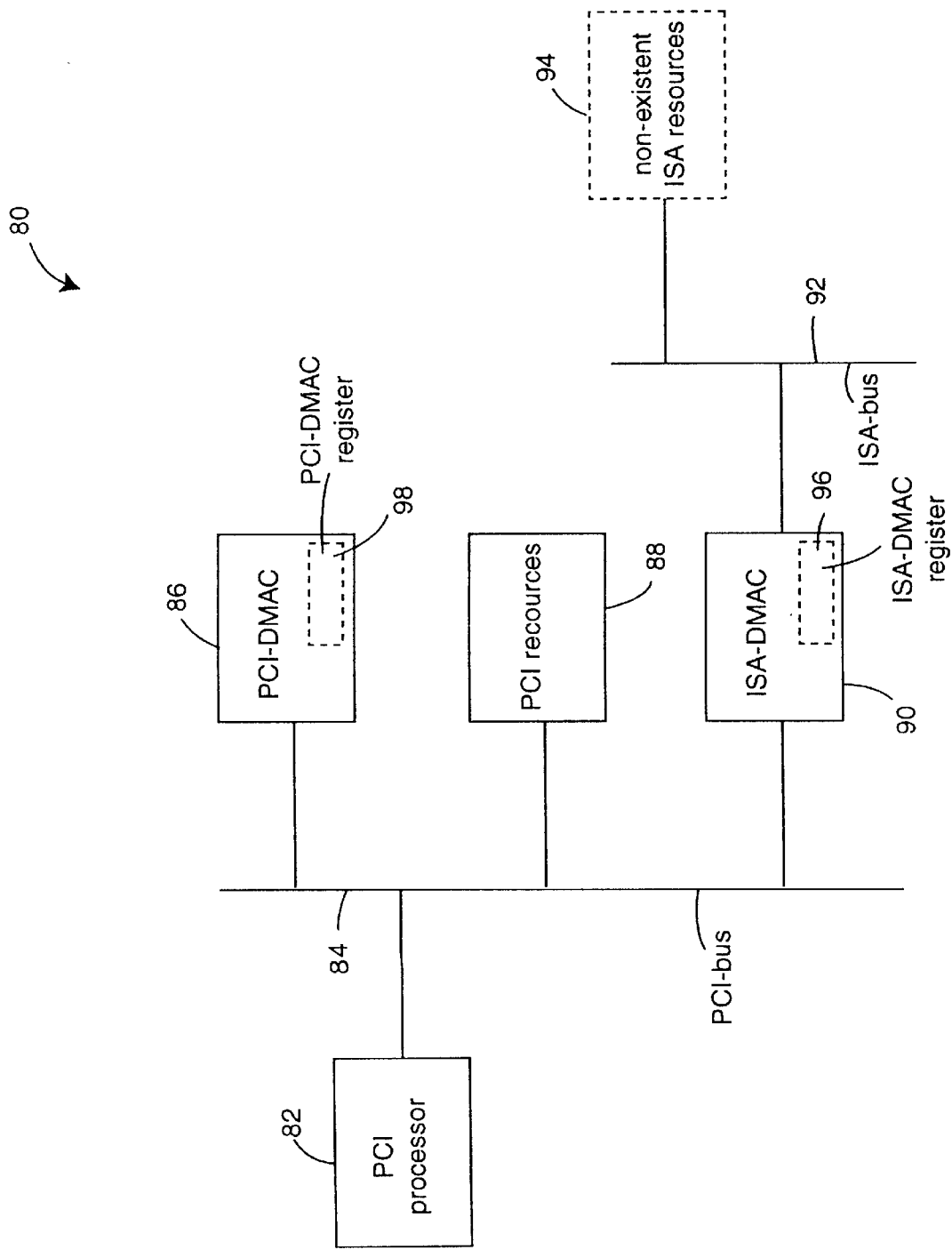
FIG. 3 is a logical representation of the mapping of PCI resources and ISA resources as concerns the PCI-processor, PCI-DMAC, and ISA-DMAC discussed in connection with FIGS. 1 and 2.

Referring now to FIG. 3, an emulation system 80 represents the logical configuration of that shown in FIGS. 1 and 2. A PCI-processor 82 is resident on a PCI-bus 84. A PCI-DMAC 86, a set of PCI resources 88, and a PCI-ISA bridge with an ISA-DMAC 90 are also resident on the PCI-bus 84. An ISA-bus 92 may or may not be connected to the ISA-DMAC 90 and non-existent ISA resources 94 are only virtually present, but not physically present. An ISA-DMAC register 96 provides command and status accessible to the PCI-processor 82, and is typically mapped and responds like an Intel 8237 DMAC. A PCI-DMAC register 98 provides command and status accessible to the PCI-processor 82 for the PCI-DMAC 86. The PCI-DMAC 86 may be included in the audio accelerator 36 or 50 of FIGS. 1 and 2.

A method embodiment of the present invention for emulating an industry standard architecture direct memory access controller (ISA-DMAC) 90 and its bus resources 94 with a peripheral component interconnect direct memory access controller (PCI-DMAC) 86 and its bus resources 88, comprises: (1) write snooping the PCI-bus processor 82 for access attempts to an ISA-DMAC register 96; (2) copying any register values detected in the step of write snooping to a corresponding PCI-DMAC register 98; (3) performing a direct memory access operation commanded by the PCI-bus processor 82 of the ISA-DMAC 90 with the PCI-DMAC 86 in the resource space of the PCI-bus 84; (4) updating a corresponding register 98 in the PCI-DMAC with a result value for the direct memory access operation; and, (5) writing back and updating a corresponding ISA-DMAC register 96 with a result value for the direct memory access operation. A software program executing on the PCI-bus processor 82 that expects an ISA-DMAC 90 and its corresponding ISA-bus resources 94 to be present will be satisfied that any direct memory access operations that it has apparently initiated on the ISA-bus 92 were responded to and provided appropriate results, e.g., via the ISA-DMAC registers 96.

"PC/PCI" is a mechanism that was defined and developed by Intel's Mobile/Handheld Products Group (MHPG) as a mobile docking solution which allows ISA slots to exist in docking stations connected to the notebook's PCI bus. This scheme is now being applied to the desktop PC as well.

PC/PCI comprises a serialization protocol for encoding and decoding DMA requests/grants. A request/grant pair, distinct from the PCI bus pair, is used to bundle requests for any combination of 8237 supported DMA channels for each device needing DMA support. This encoded mapping on the PC/PCI agent's request/grant pair provides the pathway that enables a PCI resident agent to deliver 8237 style DMA requests to the system without requiring separate and distinct DREQ/DACK# pins for each DMA channel that is used by the PC/PCI agent.

The PC/PCI DMA request serialization decoder is not a function of the standard PCI bus arbiter, and therefore there is no guaranteed connection between the PCI expansion slots and the serialization logic. The AT* compatible interrupt requests (IRQs) are provided directly to an 8259 compatible interrupt controller via a sideband connection from the PCI device. These sideband signals are not supported in the PCI slot definition.

PC/PCI is software transparent and does not require the PCI agent which implements it to be a PCI master, thus lowering the cost and complexity of an implementation on the part of peripheral vendors. Technical support can be provided by a single source.

DDMA is an alternative legacy DMA solution that effectively "distributes" the 8237 DMA controller into physically separate PCI resident components on a per DMA channel basis.

A "master DMA agent" central resource is located, e.g., on the audio accelerator 36, to orchestrate legacy I/O traffic to and from the distributed DMA elements of the system. The DMA master intercepts all 8237 I/O register references and redirects, via a software configured lookup table, these accesses to distributed agents throughout the system. Since the 8237 DMAC programming model, for control/status registers, combines data for all of its DMA channels within single I/O registers, the DMA master typically scatters and gathers several bus transactions to complete a single legacy I/O register read or write. DDMA, as for PC/PCI, is also suggested to be a motherboard device solution. While the bus mastership interface could well be handled by a standard PCI slot, there is no guaranteed means for connection via the standard PCI slot of the legacy interrupt request signal lines. DDMA devices most likely will appear with a new serialized interrupt request scheme which calls for serially encoding IRQ information onto PCI bus standard PIRQ(A:D) signal lines (similar to encoding for PC/PCI DMA requests). However, PCI slot add-in DDMA agents could exhibit interoperability issues, since the connection of its PCI slot interrupt request signal to a serialization protocol capable receiver on the motherboard is not guaranteed.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for emulating an industry standard architecture direct memory access controller (ISA-DMAC) and its bus resources with a peripheral component interconnect direct memory access controller (PCI-DMAC) and its bus resources, comprising the steps of:

write snooping a PCI-bus processor accessing a PCI-bus for access attempts to an ISA-DMAC register;

copying any register values detected in the step of write snooping to a corresponding register in a PCI-DMAC;

performing a direct memory access operation commanded by said PCI-bus processor of the ISA-DMAC with said PCI-DMAC in the PCI-bus resource space;

updating a corresponding register in said PCI-DMAC with a result value for said direct memory access operation; and writing back and updating a corresponding ISA-DMAC register with a result value for said direct memory access operation;

wherein, a software program executing on said PCI-bus processor that expects an ISA-DMAC and its corresponding ISA-bus resources to be present will be satisfied that any direct memory access operations that it has apparently initiated on said ISA-bus were responded to and provided appropriate results.

2. The method of claim 1, wherein:

the step of write-snooping is provided by an audio accelerator resident on said PCI-bus.

3. The method of claim 1, wherein:

the step of copying-any-register-values-detected is provided by an audio accelerator resident on said PCI-bus.

4. The method of claim 1, wherein:

the step of performing-a-direct-memory-access-operation is provided by said PCI-DMAC disposed on an audio accelerator resident on said PCI-bus and acts on resources mapped into PCI-bus space.

5. The method of claim 1, wherein:

the step of updating-a-corresponding-register is provided by said PCI-DMAC disposed on an audio accelerator resident on said PCI-bus and is done when a program can access said PCI-DMAC directly.

6. The method of claim 1, wherein:

the step of writing-back-and-updating is provided by said PCI-DMAC disposed on an audio accelerator resident on said PCI-bus and is done when a program executing on said PCI-bus processor cannot access said PCI-DMAC directly and expects to find a result in a ISA-DMAC register.

* * * * *